Sept. 8, 1931.  K. PERKINS  1,822,859

ELECTRIC MOTOR

Filed June 29, 1929

Witnesses:
Geo. Wright.
John F. Heine.

Inventor
Kenneth Perkins
By Henry J. Miller
Attorney

Patented Sept. 8, 1931

1,822,859

UNITED STATES PATENT OFFICE

KENNETH PERKINS, OF ELIZABETH, NEW JERSEY, ASSIGNOR TO THE SINGER MANUFACTURING COMPANY, OF ELIZABETH, NEW JERSEY, A CORPORATION OF NEW JERSEY

ELECTRIC MOTOR

Application filed June 29, 1929. Serial No. 374,784.

This invention relates to electric motors, more particularly of the small or fractional horse-power type commonly used for driving household appliances, hand-tools and the like, or for purposes where the user is likely to come in contact with the exterior of the motor or the appliance associated with it. In these cases, with motors as ordinarily constructed, a breakdown of the usual or primary system of insulation charges the frame and shaft of the motor electrically, as well as the frame of the device or machine on which the motor is mounted or to which it may be metallically connected, thereby subjecting the user to the annoyance or danger of an electric shock.

According to the present improvement, the motor is provided with a secondary system of insulation completely protecting the exposed parts of the motor, as well as the device or appliance on which the motor is mounted or to which it is connected, from an electrically charged motor field-frame or armature-frame occasioned by a breakdown of the usual primary system of motor-insulation.

The invention is more particularly concerned with sewing machine motors which are flattened in accordance with the disclosure of the Diehl et al. Patent No. 1,488,234, of March 25, 1924, for mounting upon the metal frame or standard of a sewing machine gooseneck in the restricted space between the standard and the adjacent wall of the cover of a carrying case or of the folding cover-leaf of a drop-head cabinet.

A feature of the invention is the means for securing a pair of flat side insulating plates in juxtaposition to the flat sides of the motor field-frame, without the use of fastening screws. The construction, in combination with motor end-covers of molded insulating material, effects complete external insulation of the motor-frame while keeping the overall width of the motor at a minimum, as is desirable in a sewing machine motor of this type.

Figure 1:
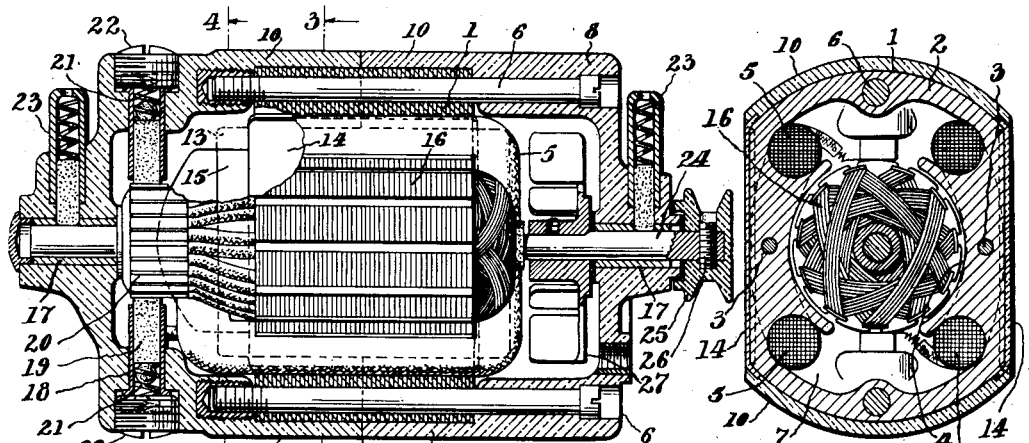
Figure 3:
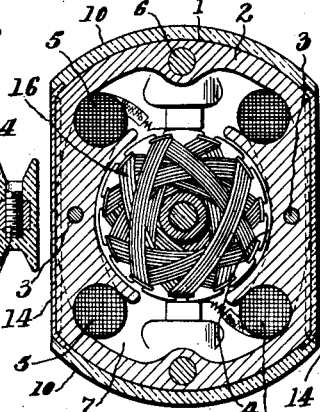
Figure 2:
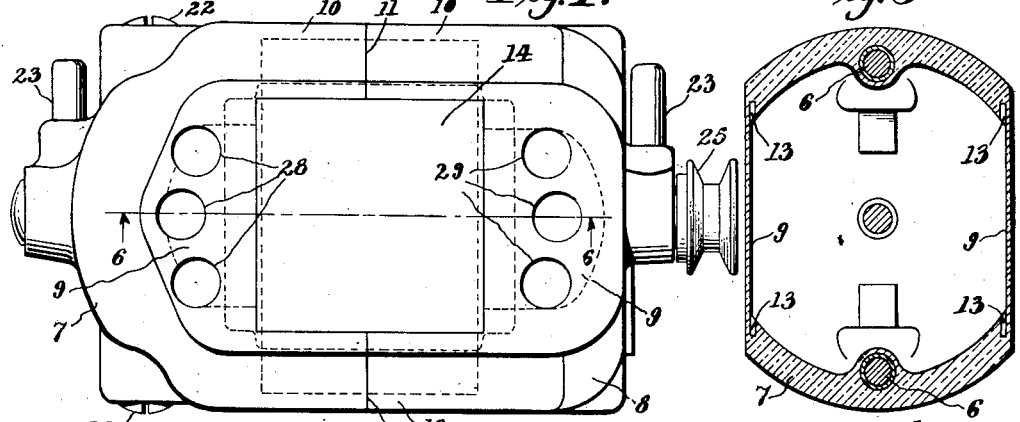
Figure 4:
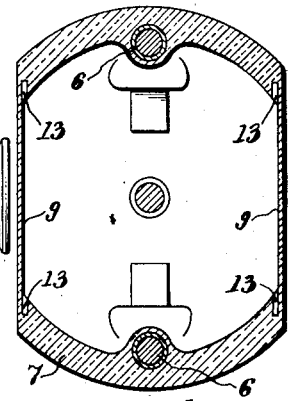
Figure 5:
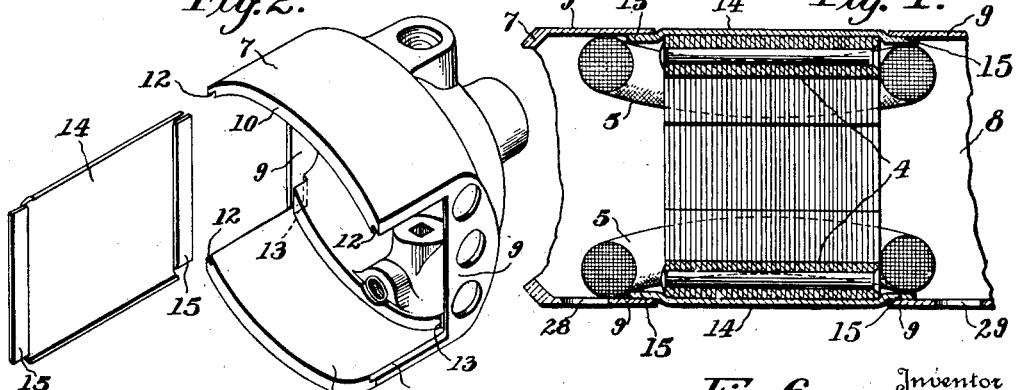
Figure 6:
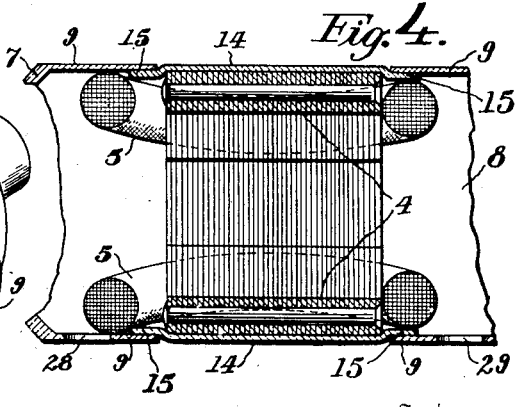

In the accompanying drawings, Fig. 1 is a longitudinal vertical section through an electric motor embodying the invention. Fig. 2 is a side elevation of the motor. Fig. 3 is a transverse vertical section on the line 3—3, Fig. 1. Fig. 4 is a section on the line 4—4, Fig. 1; the motor end-cover only being shown. Fig. 5 is a disassembled perspective view of one of the motor end-covers and insulation plates, and Fig. 6 is a horizontal section through the field-frame on the line 6—6, Fig. 2.

The motor comprises a field-frame 1 made up from a stack of steel laminations 2 held together by rivets 3 and presenting internally disposed poles 4 embraced by field-coils 5. Clamped to the opposite ends of the field-frame 1 by bolts 6 are the end-covers 7, 8 of molded heat-resisting insulating material, for example, one of the commercially well known phenolic condensation products or artificial resins. The end-covers 7, 8 have flat sides 9 and curved flanges 10 between the planes of the flat sides 9. The flanges 10 extend over and cover the external portions of the field-frame 1 between the flat sides of the latter; said flanges meeting at 11. The flanges 10 are dove-tailed at 12 and the end-covers are provided with internal recess 13 at the junctures of the flanges 10 with the end-cover bodies.

The flat sides of the field-frame 1 are covered by the side plates 14 of sheet insulation, such as bakelized paper, having their upper and lower edges received in the dove-tailed grooves 12 and their inwardly offset ends 15 underlapping the sides 9 of the end-covers and received in the recesses 13. It will be observed that the side plates 14 may be placed in juxtaposition with the side faces of the field-frame and the end-covers slipped over the field-frame and side plates 14 in assembling the motor; the side plates being securely held in position without the use of fastening screws. A minimum overall width of the motor is retained in a motor having its exterior completely insulated.

The usual armature 16 is journaled in bearing sleeve inserts 17 in the end-covers. The end-cover 7 is provided with tubes 18 for the brushes 19 which are pressed upon the commutator 20 by the brush-springs 21 backed by breech-screws 22 molded from the same material as the end-covers. Oil-cups 23 are provided to lubricate the armature-shaft 24.

A pulley 25, molded from the same insulating material as the end-covers, is secured to the shaft 24 by a set-screw 26 which is threaded into the shaft 24.

A fan 27 secured to the shaft 24 sucks air into the motor through the ventilating openings 28 in the end-cover 7 and blows it out through the ventilating openings 29 in the end-cover 8.

Having thus set forth the nature of the invention, what I claim herein is:—

1. An electric motor having a laminated field-frame flattened at its opposite sides, end-covers of molded heat-resisting insulating material secured to said field-frame and having flanges extending over and completely covering the external portions of the field-frame between the flat sides of the latter, and flat sheets of insulating material covering the flat sides of the field-frame and dove-tailed into the end-cover flanges.

2. An electric motor having a laminated field-frame flattened at its opposite sides, end-covers of molded heat-resisting insulating material secured to said field-frame and having flanges covering the external portions of the field-frame between the flat sides of the latter, said end-covers having recesses at the juncture of their flanges and body-portions, and sheets of insulating material covering the flattened sides of the field-frame and having corner portions received in said recesses.

3. An electric motor having a laminated field-frame flattened at its opposite sides, end-covers of molded heat-resisting insulating material secured to said field-frame, said end-covers having flat sides and curved flanges between the planes of their flat sides, said flanges covering the external portions of the field-frame between the flat sides of the latter, and insulating sheets covering the flat sides of the field-frame and having their ends offset inwardly and extending under the flat sides of the end-covers.

4. An electric motor having a field-frame flattened at its opposite sides, end-covers of molded heat-resisting insulating material secured to said field-frame and having flanges extending over and completely covering the external portions of the field-frame between the flattened sides of the latter, said end-covers also having recesses, and separate sheets of insulating material covering the flattened sides of the field-frame and having portions received in said end-cover recesses.

In testimony whereof, I have signed my name to this specification.

KENNETH PERKINS.